US009919647B2

United States Patent
Chen et al.

(10) Patent No.: US 9,919,647 B2
(45) Date of Patent: Mar. 20, 2018

(54) INTUITIVE HAPTIC ALERTS

(71) Applicant: Ford Global Technologies, LLC, Dearborn, MI (US)

(72) Inventors: Yifan Chen, Ann Arbor, MI (US); Pietro Buttolo, Dearborn Heights, MI (US); James Peng, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/144,342

(22) Filed: May 2, 2016

(65) Prior Publication Data

US 2017/0313246 A1 Nov. 2, 2017

(51) Int. Cl.
  *B60Q 9/00* (2006.01)
  *B60Q 5/00* (2006.01)
  *B60Q 1/52* (2006.01)
  *B60R 21/0134* (2006.01)

(52) U.S. Cl.
  CPC ............. *B60Q 9/008* (2013.01); *B60Q 1/525* (2013.01); *B60Q 5/006* (2013.01); *B60Q 9/002* (2013.01); *B60R 21/0134* (2013.01)

(58) Field of Classification Search
  None
  See application file for complete search history.

(56) References Cited

U.S. PATENT DOCUMENTS

| 7,908,060 | B2 | 3/2011 | Basson et al. |
| 8,319,620 | B2 | 11/2012 | Usher et al. |
| 2004/0049323 | A1 | 3/2004 | Tijerina |
| 2004/0252020 | A1 | 12/2004 | Matsumoto |
| 2007/0050110 | A1 | 3/2007 | Kondoh |
| 2007/0244641 | A1* | 10/2007 | Altan ............... B60Q 9/008 |
| | | | 701/300 |
| 2011/0032119 | A1 | 2/2011 | Pfeiffer |
| 2011/0169626 | A1* | 7/2011 | Sun ................. B60Q 9/008 |
| | | | 340/439 |

(Continued)

FOREIGN PATENT DOCUMENTS

CN 203242181 U 10/2013
KR 1020140036367 A 3/2014

OTHER PUBLICATIONS

Christopher Nebolsky, *Haptic Blind Spot Alert System*, Spring 2013 Haptics Class Project Paper presented at the University of South Florida, Apr. 29, 2013, (16 Pages).

(Continued)

*Primary Examiner* — Leon-Viet Nguyen
(74) *Attorney, Agent, or Firm* — James P. Muraff; Neal, Gerber & Eisenberg LLP (57) ABSTRACT

The present disclosure relates to an intuitive haptic alert system that: (1) Identifies a second vehicle; projects a series of virtual waves emanating from the second vehicle at a source frequency, estimates observed frequencies of the virtual waves at the first vehicle according to the Doppler Effect, and generates a sequence of commands for a haptic motor based on the estimated observed frequencies. (2) Projects rumble zone(s) over road; identifies when the vehicle occupies the zone(s); generates a sequence of commands for a haptic motor based on: an identified occupation and received vehicle velocity.

11 Claims, 9 Drawing Sheets

(56) References Cited

U.S. PATENT DOCUMENTS

| | | |
|---|---|---|
| 2012/0293313 A1 | 11/2012 | Yu |
| 2013/0342330 A1 | 12/2013 | Kiefer |
| 2014/0257659 A1* | 9/2014 | Dariush ................ G08G 1/166 701/70 |
| 2015/0246639 A1 | 9/2015 | Nagata et al. |
| 2015/0309562 A1 | 10/2015 | Shams et al. |
| 2015/0355711 A1 | 12/2015 | Rihn |

OTHER PUBLICATIONS

*Introduction to Haptic Feedback*, 2015, England (8 Pages).
William (Skip) Outcalt, *Centerline Rumble Strips*, Report No. CDOT-DTD-R-2001-8, Department of Transportation Research, Aug. 2001, Denver, Colorado (15 Pages).
Bahador Saket et al, *Designing an Effective Vibration-Based Notification Interface for Mobile Phones*, School of Computing, National University of Singapore, Singapore, (11 Pages).
Christophe Tandonnet et al, *Tactile Stimulations and Wheel Rotation Responses: Toward Augmented Lane Departure Warning Systems*, Frontiers in Psychology, Oct. 2014, (11 Pages).
*Doppler Effect*, Wikipedia, the Free Encyclopedia, (10 Pages).
Kal Kaur, *Vehicle Crash Sensors: Blind Spot Detection*, (3 Pages).

\* cited by examiner

INTUITIVE HAPTIC ALERTS

TECHNICAL FIELD

Systems and methods for generating intuitive haptic alerts are disclosed. In some embodiments, a wearable object, such as a smart-watch generates these haptic alerts based on driving events. These haptic alerts enhance driver safety.

BACKGROUND

Smart wearable devices, such as the Apple Watch®, are configured to vibrate on a user's wrist. The smart wearable is often configured to vibrate in response to a set of events. For example, the Apple Watch® is configured to vibrate upon detecting an incoming cellular call, text message, or email. These kinds of alerts are called haptic alerts because they attract a user's attention via the sense of touch.

SUMMARY

In various embodiments, the present disclosure relates to an intuitive haptic alert system including processor(s) in operative communication with a first vehicle and configured to: identify a second vehicle; project a series of virtual waves emanating from the second vehicle at a source frequency, estimate observed frequencies of the virtual waves at the first vehicle according to the Doppler Effect, and generate a sequence of commands for a haptic motor based on the estimated observed frequencies.

In various embodiments, the present disclosure relates to an intuitive haptic alert system including processor(s) in operative communication with a vehicle and configured to: project rumble zone(s) over road; identify when the vehicle occupies the zone(s); generate a sequence of commands for a haptic motor based on: an identified occupation and received vehicle velocity.

BRIEF DESCRIPTION OF THE DRAWINGS

For a better understanding of the invention, reference may be made to embodiments shown in the following drawings. The components in the drawings are not necessarily to scale and r elated elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or".

Figure 1:
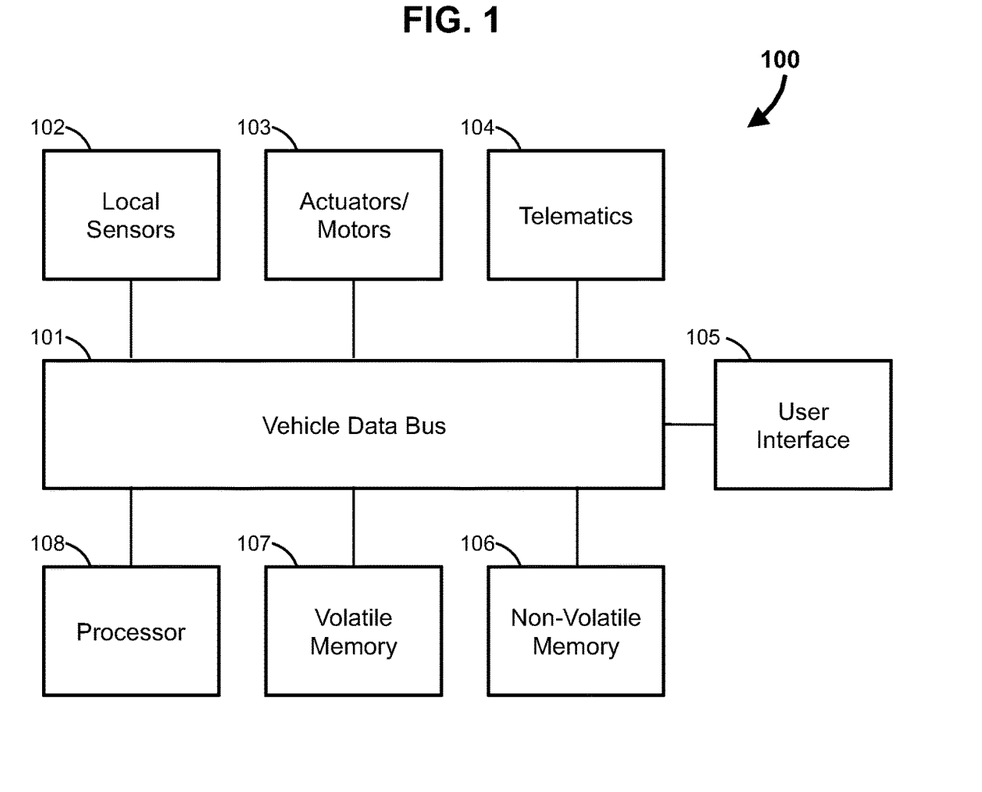
FIG. 1 is a block diagram of a computing system for a vehicle.

FIG. 1 shows a computing system 100 of an example vehicle. The vehicle includes a motor, a battery, at least one wheel driven by the motor, and a steering system configured to turn the at least one wheel about an axis. Suitable vehicles are also described, for example, in U.S. patent application Ser. No. 14/991,496, which is hereby incorporated by reference in its entirety. The computing system 100 enables automatic control of mechanical systems within the device. It also enables communication with external devices. The computing system 100 includes a data bus 101, one or more processors 108, volatile memory 107, non-volatile memory 106, user interfaces 105, a telematics unit 104, actuators and motors 103, and local sensors 102.

The data bus 101 traffics electronic signals or data between the electronic components. The processor 108 performs operations on the electronic signals or data to produce modified electronic signals or data. The volatile memory 107 stores data for immediate recall by the processor 108. The non-volatile memory 106 stores data for recall to the volatile memory 107 and/or the processor 108. The non-volatile memory 106 includes a range of non-volatile memories including hard drives, SSDs, DVDs, Blu-Rays, etc. The user interface 105 includes displays, touch-screen displays, keyboards, buttons, and other devices that enable user interaction with the computing system. The telematics unit 104 enables both wired and wireless communication with external processors via Bluetooth, cellular data (e.g., 3G, LTE), USB, etc. The actuators/motors 103 produce physical results. Examples of actuators/motors include fuel injectors, windshield wipers, transmissions, airbags, haptic motors or engines etc. The local sensors 102 transmit digital readings or measurements to the processor 108. Examples of suitable sensors include temperature sensors, rotation sensors, seatbelt sensors, speed sensors, cameras, lidar sensors, radar sensors, etc. It should be appreciated that the various connected components of FIG. 1 may include separate or dedicated processors and memory. Further detail of the structure and operations of the computing system 100 is described, for example, in U.S. patent application Ser. No. 14/991,496.

Figure 2:
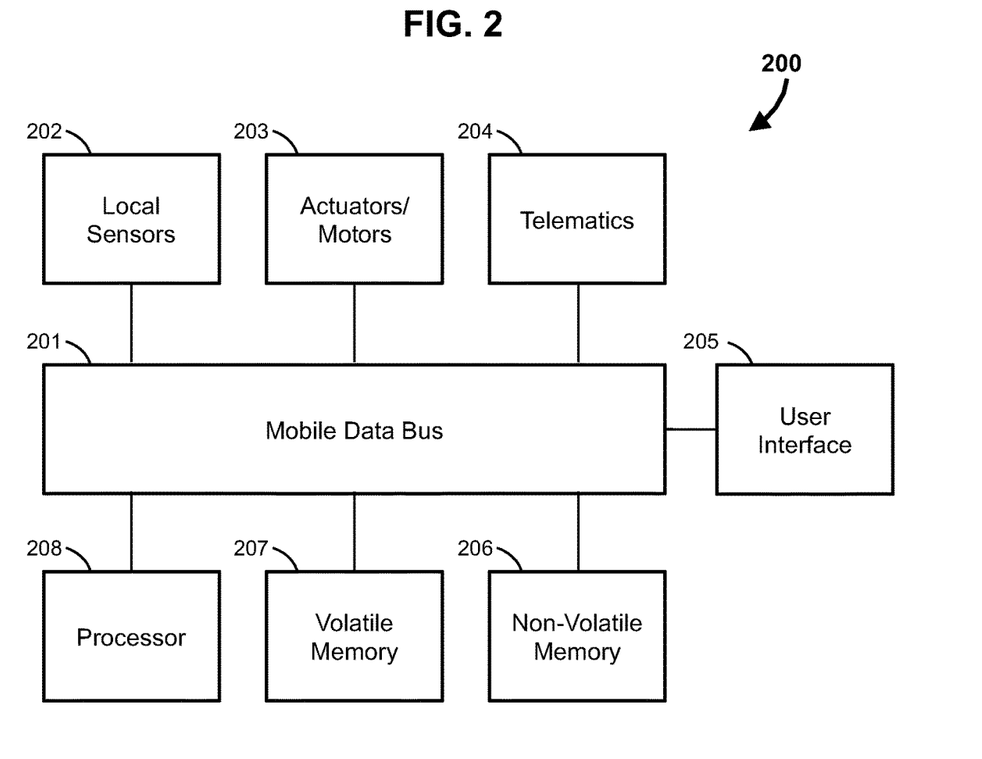
FIG. 2 is a block diagram of a computing system for a smart wearable

FIG. 2 shows a computing system 200 of a smart wearable. The smart wearable may be a smart watch with an adjustable strap that fits around a user's arm or wrist and a rechargeable lithium ion battery. The computing system 200 of the smart wearable functions similarly to the computer system 100 of the vehicle. The above disclosure related to components 101 to 108 of the computing system 100 applies to corresponding components 201 to 208 of the computing system 200. It should be appreciated that the wearable includes an accelerometer sensor 202 and haptic motor or engine 203.

A haptic motor is configured to drive or oscillate a mass. Oscillation of the mass induces vibrations. The oscillation can involve sliding a mass back and forth along a longitudinal slot. The oscillation can involve rotation or spinning of an asymmetrical mass. Example haptic motors or engines are described in Introduction to Haptic Feedback by Precision Microdrives™, which is hereby incorporated by reference in its entirety It should be appreciated that the vehicle and the smart wearable may be configured to perform the methods and operations described below. In some cases, the vehicle and the smart wearable are configured to perform these functions via computer programs stored on the various volatile or non-volatile memories of the computing systems 100 and 200. In other words, a processor may be configured to perform a disclosed operation when it is in operative communication with memory storing a software program with code or instructions embodying the disclosed operation. Further description of how the processor, memories, and programs cooperate appears in U.S. patent application Ser. No. 14/991,496.

FIGS. 3 to 9 relate to example applications or use-cases of the haptic engine of the wearable device with the vehicle. More specifically, FIGS. 3 to 9 illustrate cases where the wearable device obtains information from the vehicle, then generates one or more haptic alerts or haptic patterns in light of the obtained information.

Figure 3:
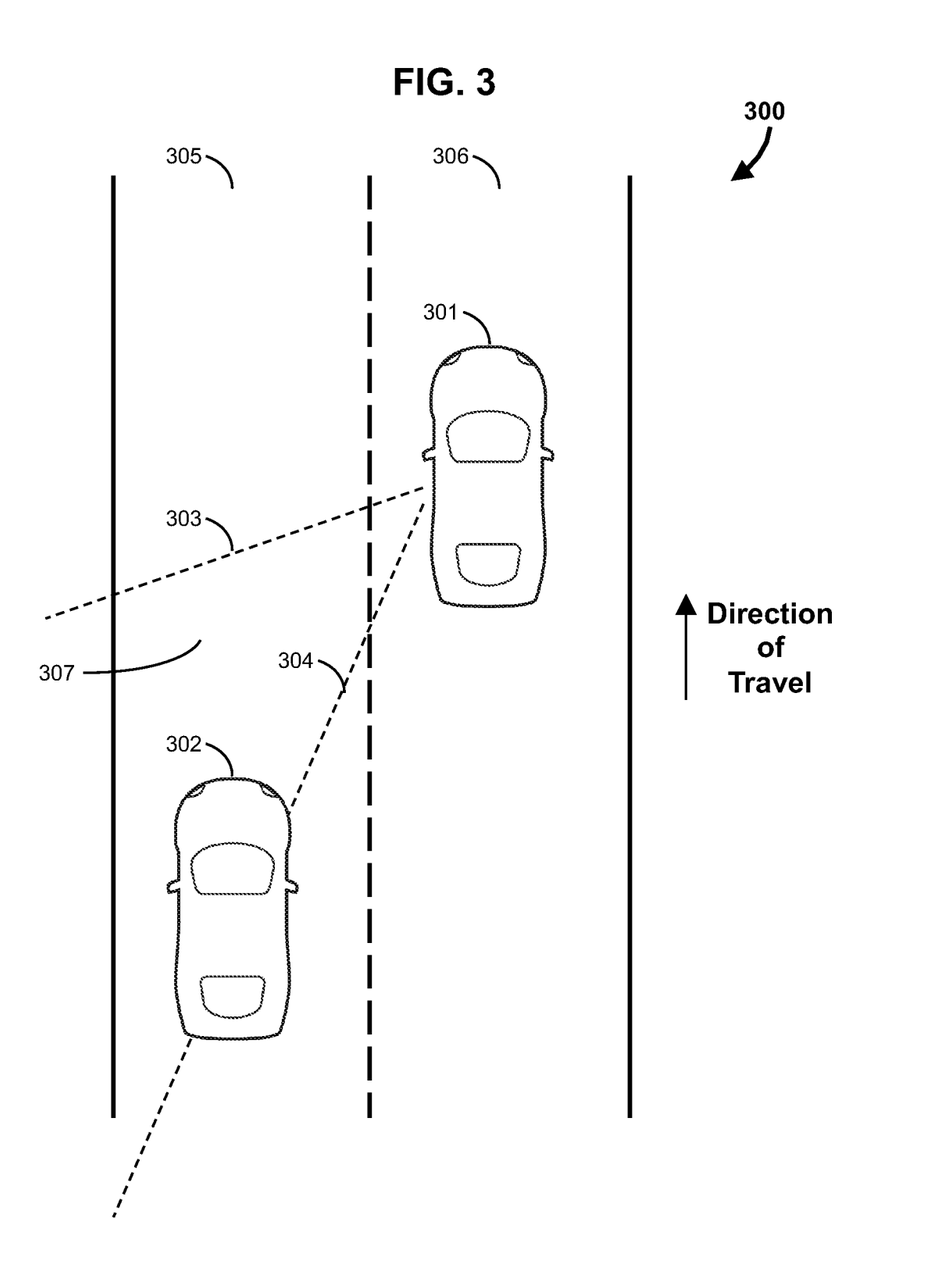
FIG. 3 is a haptic feedback use case

Turning to FIG. 3, a first vehicle 301 communicates with a wearable (not shown) strapped to a driver. The first vehicle 301 is traveling in the same direction as vehicle 302 along a street or highway. The first vehicle 301 is in lane 306. A second vehicle 302 is in lane 305. The first vehicle 301 has a blind spot 307 defined between lines 303 and 304. A portion of a frame, such as a column, of the first vehicle 301 typically obstructs the driver's view, resulting in the blind spot 307. The first vehicle 301 includes blind spot sensors and blind spot programs (i.e., a blind spot module). The blind spot module detects when an outside vehicle, such as the second vehicle 302, occupies a portion of the blind spot 307. Here, the blind spot module would detect a presence of the second vehicle 302 in the blind spot 307. Haptic Blind Spot Alert System by Christopher Nebolsky, which is hereby incorporated by reference in its entirety, describes example blind spot programs and sensors.

The first vehicle 301 also includes ranging sensors and ranging programs configured to communicate or interface with the blind spot programs. The sensors are configured to detect or measure outside vehicles within sensing range of the first vehicle 301. The ranging programs are configured to convert the detections or measurements of the ranging sensors into properties that are associated with the outside vehicles. In the present case, the ranging sensors and programs cooperate to estimate a location, velocity, and acceleration of the second vehicle 302. U.S. patent application Ser. No. 14/991,496 includes example ranging programs and sensors.

A haptic program resident on the first vehicle 301 or the smart wearable is configured to interface with the blind spot programs and the ranging programs. The haptic program is configured to generate instructions (or cause another program to generate instructions) for the haptic engine. These instructions may include a magnitude of haptic feedback, and a timing of haptic feedback to produce a haptic feedback pattern. FIGS. 6 and 7a to 7c include example haptic feedback patterns.

In some embodiments, the haptic engine is binary in magnitude (i.e., can only produce on and off states, not variable on states). In these embodiments, the instructions include or relate to series of motor ON times and a series of motor OFF times. For example, these instructions could be represented in the follow matrix: [ON 30 milliseconds, OFF 15 ms, ON 2 seconds, OFF 3 seconds, etc.]. This matrix would cause the haptic engine on the smart wearable to generate the following haptic pattern: vibration for 30 ms, pause for 15 ms, generate vibration for 2 seconds, pause for 3 seconds etc.

If the motor can produce feedback of varying magnitude, then the instructions could be represented in the following matrix: [ON 30 ms at Motor Rate 5; OFF 15 ms; ON 2 seconds at a starting Motor Rate of 6, Reduce Motor Rate by 10% every 20 ms; OFF 3 seconds]. Designing an Effective Vibration-Based Notification Interface for Mobile Phones by Bahadhor Saket, et. al. and Tactile Simulations and Wheel Rotation Responses: Toward Augmented Lane Departure Warning systems by Boris Burle et. al., both of which are hereby incorporated by reference in their entirety, describe haptic feedback patterns.

As mentioned above, this disclosure includes matrices with ON times and OFF times. It should be appreciated that in some applications, the OFF times may precede the ON times. In other words, a pattern with a matrix of [10 ms ON, 10 ms OFF] may be alternatively represented with a matrix of [10 ms OFF, 10 ms ON]. Thus, in the applications and use-cases discussed below, each "ON" may be replaced with an "OFF" and each "OFF" may be replaced with an "ON."

Returning now to FIG. 3, the haptic program is configured to generate haptic instructions/haptic feedback (referred to as haptic feedback, but as stated above, it could be instructions for another program to produce haptic feedback) in light of the blind spot program and the ranging program. More specifically, the haptic program is configured to generate intuitive haptic feedback simulating the Doppler Effect.

The Doppler Effect (also known as Doppler Shift) is a change in frequency of a signal due to motion of the signal observer relative to the signal source. Imagine a police car with its siren blaring. The police car (i.e., the source) generates the siren at a constant frequency. The siren is a sound wave. A person is standing still on the street. At a first moment in time, the police car is stationary and the person perceives the siren at a first frequency. At a second moment in time, the police car is traveling toward the person and producing the same siren. However, the person now perceives the siren at a second, higher frequency because the distance between consecutive siren waves is compressed due to the police car's motion. At a third moment in time, the police car has passed the person and is traveling away from the person. The police car produces the same siren. However, the person now perceives the siren at a third, lower frequency because the motion of the police car has extended the distance between consecutive sirens.

The Doppler Effect is a known phenomenon and is explained, for example, in the Wikipedia entry on Doppler Effect as of Apr. 11, 2016, which is hereby incorporated by reference in its entirety. The following equation represents the relationship between an observed frequency and an emitted frequency: $f=f_o*(c+v_r)/(c+v_s)$. In this equation, f is the observed frequency; $f_o$ is the emitted frequency; c is the wave velocity; $v_r$ is the velocity of the observer relative to the medium and is positive if the observer is moving towards the source; $v_s$ is the velocity of the source relative to the medium and is positive if the source is moving away from the receiver.

If $v_s$ and $v_r$ are small relative to c, then the following equation represents the approximate relationship between the observed frequency and the emitted frequency: $f-f_o=f_o*(v_r-v_s)/c$. Here, $(v_r-v_s)$ is positive when the observer and the source are moving toward each other. It should be appreciated that when the claims include the term "Doppler Effect", the claims contemplate and read on either one of the complete Doppler Effect and the approximated Doppler Effect.

An insight of the present disclosure is that the above equations can be applied to produce intuitive haptic feedback patterns. More specifically, f is defined to be the frequency of an imaginary emitted wave of an outside vehicle, such as the second vehicle 302. For example, the second vehicle 302 can be imagined to be broadcasting a police car siren (a sound wave). This value, f, is predetermined, although it may be user-adjustable. In turn, $f_o$, is the observed frequency of the imaginary siren at the first vehicle 301. The velocity of the second vehicle 302 is $v_s$. The velocity of the first vehicle 301 is $v_r$. The constant, c, is also predetermined and it may be user-adjustable. In the case of an imaginary siren, it would be the known velocity of sound waves.

The haptic program is configured to generate haptic feedback in light of these equations. More specifically, the haptic program is configured to generate a feedback signal with a specific frequency. The specific frequency can be represented in terms of ON time and OFF time. For example, a haptic signal with a frequency of 50 Hz would be represented by the following matrix: [ON 10 ms; OFF 10 ms]. More specifically, a frequency of 50 Hz conveys that the haptic signal is sized to enable repetition exactly 50 times per second. One second includes 1000 ms. Thus, a single 50 Hz haptic signal should be 1000 ms/50=20 ms long. Dividing 20 ms into two equal parts yields ON for 10 ms and OFF for 10 ms (i.e., 10 ms+10 ms=20 ms). As another example, a haptic signal with a frequency of 10 Hz would be represented by the following matrix: [ON 50 ms; OFF 50 ms]. The haptic program can now apply the measured variables (e.g., the velocities measured reported by the sensors) and predetermined or preset constants to generate new haptic signals. As previously discussed, the preset constants include $f_o$ and c. The measured variables include $v_s$ and $v_r$. The output of the equation is f.

When the relationship between the first and second vehicles 301 and 302 satisfies one or more conditions, the haptic program begins to generate haptic signals. One of the conditions may be the second vehicle 302 entering the blind spot 307 of the first vehicle 301. One of the conditions may be the second vehicle 302 is a predetermined distance or less from the first vehicle 301. The predetermined distance may be measured diagonally from the first vehicle 301 to the second vehicle 302 or with a line perpendicular to a plane defining the rear surface of the first vehicle 301 and a plane defining the front surface of the second vehicle 302 (i.e., the longitudinal distance between the vehicles measured parallel to the road). One of the conditions may be the second vehicle having a predetermined velocity or greater at the predetermined distance or less. In various embodiments, the predetermined velocity is any velocity greater than the speed of the first vehicle 301. One of the conditions may be a lane relationship of the vehicles, such that the haptic program only produces haptic feedback when the first and second vehicles 301 and 302 are in distinct and directly adjacent lanes. One of the conditions may be that the second vehicle 302 is behind the first vehicle 301. One of the conditions may be that the first vehicle 301 has an active turn signal in the direction of the lane occupied by the second vehicle (e.g., left turn signal of the first vehicle 301 is on and the second vehicle 302 is in the lane directly to the left of the first vehicle 301). As with all conditions discussed herein, it should be appreciated that some or all of the above conditions may be simultaneously required. The conditions (including the other conditions disclosed below) may be re-evaluated at a predetermined cycling frequency. As such, the haptic feedback patterns may stop when the conditions no longer exist.

When the conditions are satisfied, the haptic program produces the following haptic feedback: [ON $1/(2f_{o1})$; OFF $1/(2f_{o1})$; ON $1/(2f_{o2})$; OFF $(1/2f_{o2})$; ON $(1/2f_{on})$; OFF $(1/2f_{on})$, etc.]. The subscript numbers, such as 1, 2, and n represent new calculations of $f_o$ made with updated velocity information.

It should be appreciated that in some embodiments, it may be desirable to integrate the relative spacing between the vehicles 301 and 302 as a variable in the generation of haptic feedback. In these embodiments, $(v_r-v_s)$ may represent the rate of change of the relative distance between the vehicles (the relative distance can be the diagonal or perpendicular distance as discussed above). In some embodiments, $(v_r-v_s)$ is replaced with a function representing the relative distance between the vehicles (e.g., (position of vehicle 1)-(position of vehicle 2)).

In some embodiments, when the haptic engine is configured to produce variable magnitude haptic feedback, the distance between the two vehicles may be represented in terms of the magnitude of the haptic feedback and the frequency of the haptic feedback signal is calculated according to relative frequency of the vehicles, as described above. In these embodiments, the haptic feedback has a larger magnitude when the distance between the vehicles 301 and 302 is small.

In some embodiments, the haptic program may be configured to generate a simplified Doppler Effect. Please note that the variables discussed below follow different syntax than the variables discussed above. In these embodiments, an initial haptic frequency is preset, a final haptic frequency is preset, and a minimum marginal frequency difference between consecutive feedback signals is preset. As discussed above, it should be appreciated that a full or complete haptic signal includes the ON interval and the OFF interval.

Here, the frequency of the haptic signals depends on the measured distance, Dn, (diagonal or perpendicular) between the first vehicle 301 and the second vehicle 302. The initial distance between the vehicles 301 and 302 is Do. The initial distance, Do, corresponds to the time when the haptic feedback program begins generating signals. When the conditions (discussed previously) are met, the haptic program begins by generating haptic feedback at the initial preset haptic frequency, Fx. Frequencies of new haptic signals, Fn, depend on newly measured or sensed distances between the first vehicle 301 and the second vehicle 302. In some embodiments, the following relationship is observed: Fn=Fx*(Do/Dn). The haptic program produces the following haptic feedback matrix: [ON 1/(2Fx); OFF 1/(2Fx); ON 1/(2Fn); OFF 1/(2Fn), etc.]. In other embodiments, the following relationship is observed: Fn=Fx+Fx*(Do/Dn). In some embodiments, Fn does not observe the above relationship but is still a function of Fx, Dn, and Do.

The above methods contemplate a single haptic signal being equally separated into an ON interval and an OFF interval. In some embodiments, the haptic signal may occupy only one of the ON interval and the OFF interval. This enables the haptic program to process dimensional updates more quickly. Imagine, for example, four haptic signals. As discussed above, each haptic signal is calculated according to updated dimensional information as recorded by the vehicle sensors of the first vehicle 301. In these embodiments, the haptic signals may observe the following relationship: [ON $1/f_1$, OFF $1/f_2$, ON $1/f_3$, OFF $1/f_4$, etc.]; or, alternatively, [ON $1/(2f_1)$, OFF $1/(2f_2)$, ON $1/(2f_3)$, OFF $1/(2f_4)$, etc.]. Note that in these embodiments, subsequent OFF intervals are not necessarily equal to their preceding ON intervals. This concept can apply to one or all of the complete Doppler Effect, approximated Doppler Effect, and simplified Doppler Effect.

Figure 7A:
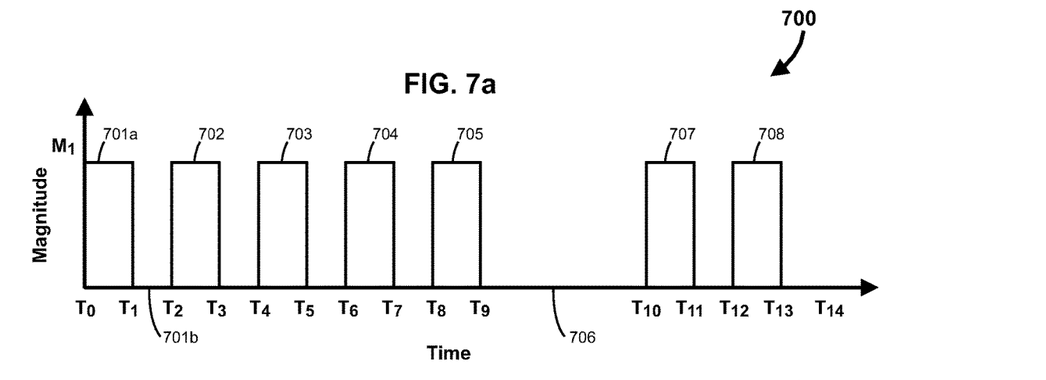
FIGS. 7a to 7c are magnitude vs. time plots of haptic feedback patterns.
Figure 7B:
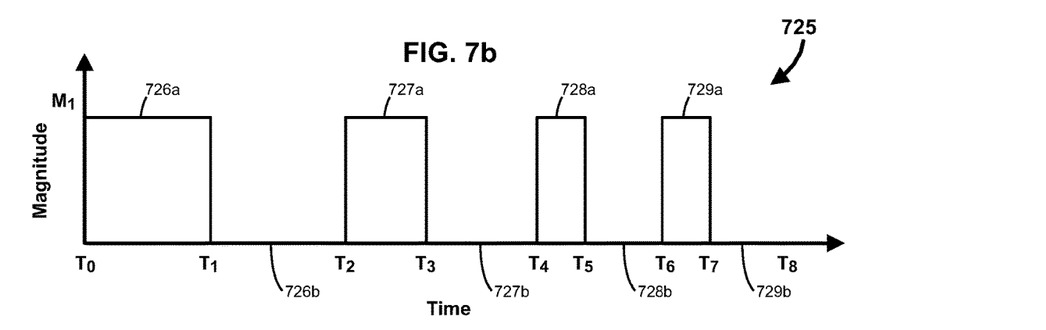

FIG. 7b represents any one of the complete Doppler Effect, approximated Doppler Effect, and simplified Doppler Effect as applied to haptic feedback. In one embodiment, the combination of 726a and 726b is a complete haptic signal. The frequency of this signal is $1/(T_2-T_0)$. Each of 726a and 726b have equal time intervals. A new haptic signal begins at 727a and ends at 727b. The same applies to 728 and 729. Note that the frequency of the haptic signals increases with time (e.g., $1/(T_4-T_2)>1/(T_2-T_0)$).

Figure 5:
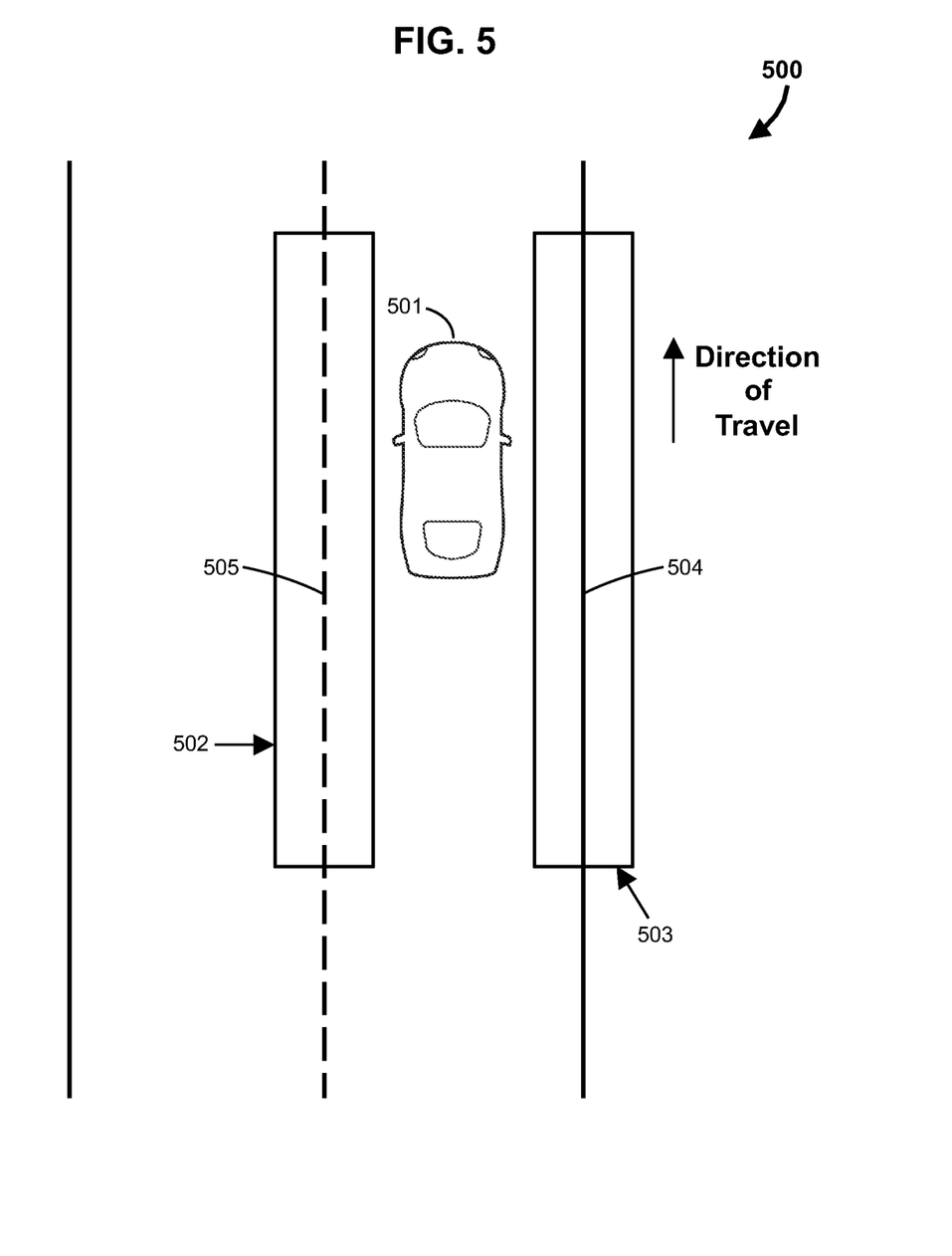
FIG. 5 is a haptic feedback use case.

FIG. 5 shows a distinct use haptic feedback use case. This use case relates to simulating rumble strips with haptic feedback patterns. Here, a vehicle 501 is traveling in a lane defined by road line 504 and divider line 505. The intent of this use-case is to alert a user when the vehicle approaches one of the lines 504 and 505, as detected or reported by the vehicle sensors. The haptic program projects or simulates imaginary rumble strip zones (i.e., rumble zones) 502 and 503 along the road.

Figure 4:
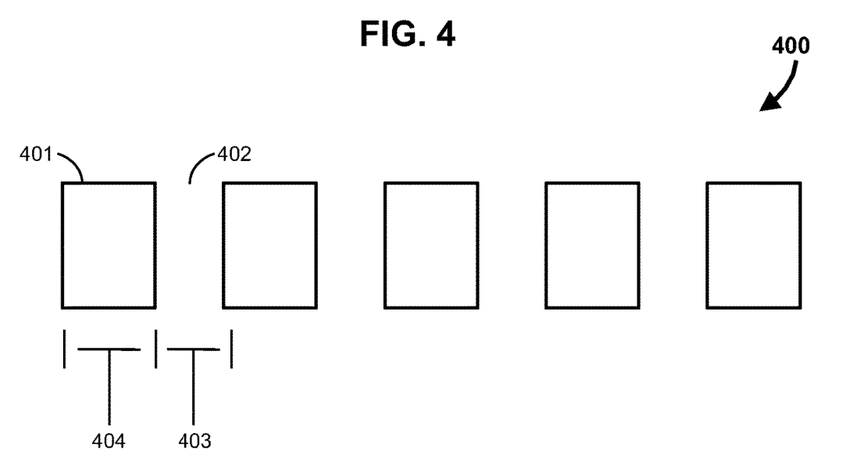
FIG. 4 is a rumble zone with a plurality of rumble strips. The major or longitudinal axis of the rumble zone would be parallel to the major or longitudinal axis of a road.

FIG. 4 shows a rumble zone including a plurality of rumble strips. Recess 401 has a length 404, a width (unnumbered), and is cut into the pavement 402 at a predetermined depth (not shown). The pavement 402 defines the recesses 401 at intervals 403. One rumble strip is the combination of a recess 401 and a road interval 402. Rumble zones extend longitudinally along a road such that a front tire of a vehicle would occupy each of the recesses 401 sequentially. Centerline Rumble Strips (Report No. CDOT-DTD-R-2001-8) by William (Skip) Outcalt, which is hereby incorporated by reference in its entirety, describes example rumble strips and rumble zones.

Returning to FIG. 5 and as described above, one of the programs, such as the haptic program, simulates imaginary rumble zones 502 and 503 along the road. The haptic program compares the current position of the vehicle to the imagine rumble zones 502 and 503. More specifically, the haptic program projects the full length and width profile of the vehicle, including the vehicle tires. When any portion of the vehicle crosses into the zones 502 and 503, the haptic program begins generating haptic feedback.

More specifically, the haptic program produces haptic feedback based on the detected or determined presence of one or more of the following conditions: the vehicle crossing into the imagine rumble zones 502 and 503; the vehicle's turn signal being OFF; the vehicle having at least a predetermined velocity; an outside vehicle being in the vehicle's blind spot; an outside vehicle being within a predetermined distance (diagonal or perpendicular) of the vehicle (discussed above with reference to the Doppler Effect) and in a lane adjacent to the vehicle and the imaginary rumble strip (i.e., rumble zone 502 would only be active if a vehicle were in the left lane of FIG. 5). When the road line being crossed represents a road boundary, as opposed to only a lane boundary (e.g, the road line separates incoming traffic from outgoing traffic or road from sidewalk as opposed to lane 1 in direction X from lane 2 also in direction X), then the haptic program may apply a different set of the above conditions. In some embodiments, the different set is one or more of the vehicle entering the zone of an imaginary rumble zone associated with the road boundary and the vehicle having a speed above a predetermined speed. As previously discussed, various embodiments require one, some, or all of these conditions to be present to begin haptic feedback.

It should be appreciated that the haptic program need not necessarily perform this dimensional analysis and that a different program, configured to interface with the haptic program, may perform the dimensional analysis and simply forward the results of the analysis to the haptic program.

The haptic program generates intuitive haptic feedback that simulates the vibrations of a vehicle traveling over actual, physical rumble strips with the following matrix: [ON for $a/v_1$; OFF for $b/v_1$; On for $a/v_2$; OFF for $b/v_2$, etc.]. Here, a is the length 404 of the rumble strip recess; b is the length of road interval between rumble strips 403; $v_n$ are newly measured, sensed, or received velocities of the vehicle. In a preferred embodiment, the ratio of a to b is 7:5. In some embodiments, the following modified rumble strip matrix is applied: [ON for $a/v_1$; OFF for $b/v_2$; On for $a/v_3$; OFF for $b/v_4$, etc.]. As described above with reference to the Doppler Effect, this modified rumble strip equation enables the haptic program to more quickly adapt to changes in vehicle speed. It should be appreciated that in various embodiments, the haptic feedback is a preset haptic feedback pattern that is independent of measured velocity.

If the haptic engine is of variable magnitude, then the haptic program may vary the magnitude based on the degree of the vehicle's entry into the imaginary zone (e.g., light haptic feedback when the front left tire begins to intersect the left line of zone 502; heavy haptic feedback when the front left tire fully occupies zone 502). In some cases, the magnitude is proportional to the degree of the vehicle's entry into the haptic zone. FIG. 5 shows the haptic zones having a width (measured in the direction perpendicular to lines 504 and 505. In these cases, the magnitude can be a minimum magnitude when the vehicle 501 intersects an outer edge of the zones 502 and 503. The magnitude may increase as the vehicle 501 occupies more of the zones. The magnitude may reach a maximum at the opposing outer edge of the zones 502 and 503. The magnitude may reach a maximum at the road lines 504 and 505. In these cases, the magnitude may stay at a maximum magnitude from the road lines 504 and 505 to the opposing outer edges of the zones.

Figure 6:
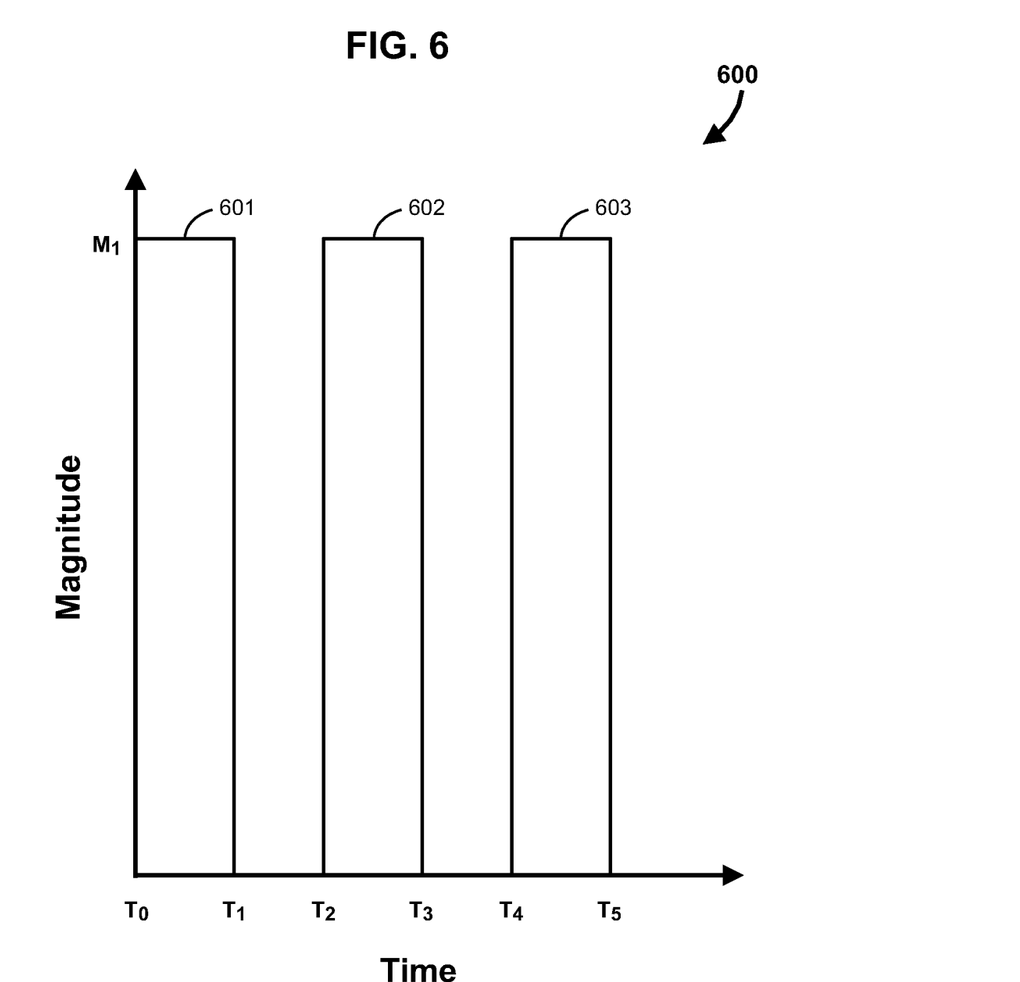
FIG. 6 is a magnitude vs. time plot of haptic feedback patterns.
Figure 7C:
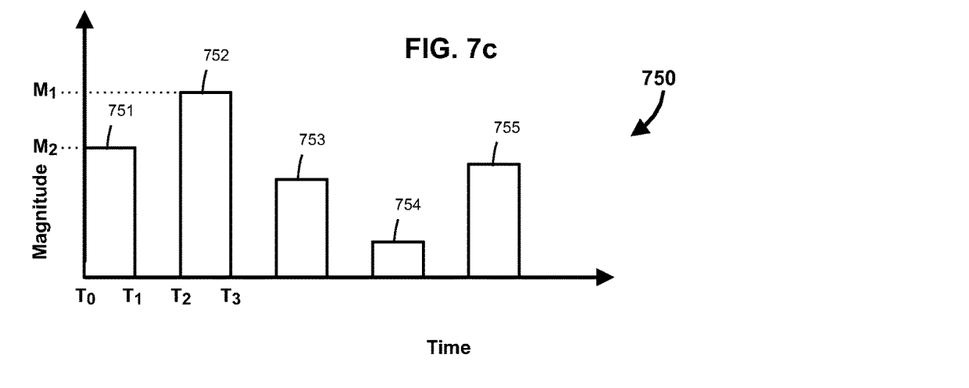

FIG. 6 illustrates haptic signals consistent with a binary haptic motor. The motor is ON at 601, 602, and 603. The motor is OFF during the time in between 601, 602, and 603. FIG. 7c illustrates haptic signals consistent with a variable haptic motor. The motor is ON at 751, 752, 753, 754, and 755. The magnitude of the haptic feedback produced by the motor varies along the Y axis.

Figure 8:
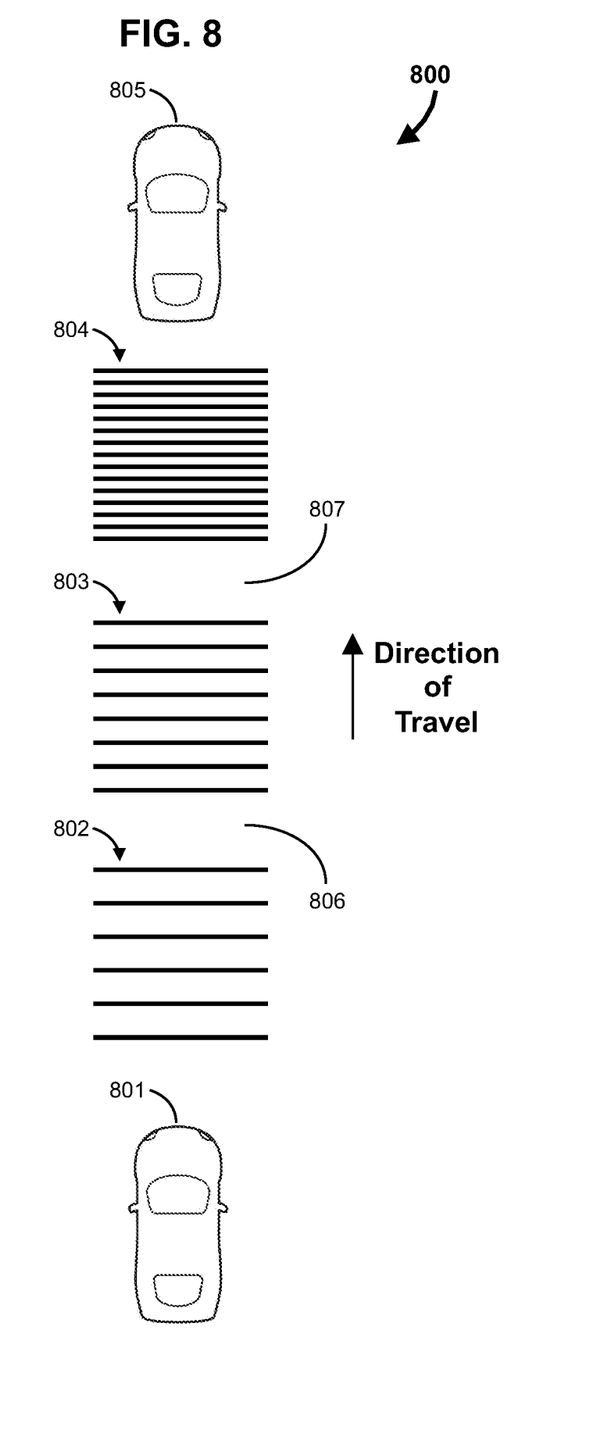
FIG. 8 is a haptic feedback use case.

FIG. 8 shows a distinct haptic feedback use case based on concepts from the use case of FIG. 5. Here, the haptic feedback relates to the longitudinal distance between a first vehicle 801 and a second vehicle 805. The haptic feedback is intended to keep the first vehicle 801 suitably spaced from the second vehicle 805. The first vehicle 801 is in communication with a smart wearable having a haptic motor.

In this use-case, the haptic program projects imaginary rumble zones 802, 803, and 804 in between the first vehicle 801 and the second vehicle 805. The haptic program also projects gaps 806 and 807 in between the rumble zones. The lengths and positions of the rumble zones 802 to 804 and the gaps 806 and 807 depend on one or more of the velocity of the first vehicle 801 and the second vehicle 805. In some embodiments, the zones and/or the gaps are lengthened as the first vehicle 801 speeds up and shortened as the first vehicle 801 slows down. Lengthening and shortening refers to the number of rumble strips in a zone, not the spacing of the rumble strips within the zone. The absolute positions of the zones and the gaps 806 and 807 adjust based on the velocity of the second vehicle 805. In other words, the absolute positions of the zones are continuously updated to extend behind a current position of the second vehicle 805. If the second vehicle 805 has a constant velocity, then the positions of the zones relative to the second vehicle 805 may be constant. In some embodiments, the haptic program only performs this use case when the first vehicle 801 exceeds a predetermined velocity. In some embodiments, these rumble strips are continuously projected. In other embodiments, these rumble strips are only projected when certain conditions are met. The conditions may include one or more of: velocity of the first vehicle 801, velocity of the second vehicle 805, the relative distance between the vehicles, and the relative velocities of the vehicles.

The first rumble strip zone 802 has a first ratio of a:b. The second rumble strip zone 803 and a second ratio of a:b. The third rumble strip zone 804 has a third ratio of a:b. As shown in FIG. 8, a/b for zone 802 is small; a/b for zone 803 is moderate; and a/b is large. In some embodiments, a/b for the zones is constant and the magnitude of the haptic feedback increases from the first zone 802 to the third zone 804. In some embodiments, a/b for the zones is variable and the magnitude of the haptic feedback increases from the first zone 802 to the third zone 804.

FIG. 7a illustrates consistent haptic signals. The motor is ON at 701a and 702 to 708. The motor is OFF at 701b, 706, and the other unnumbered gaps. Motor OFF at 706 represents one of the gaps 806 or 807.

Figure 9:
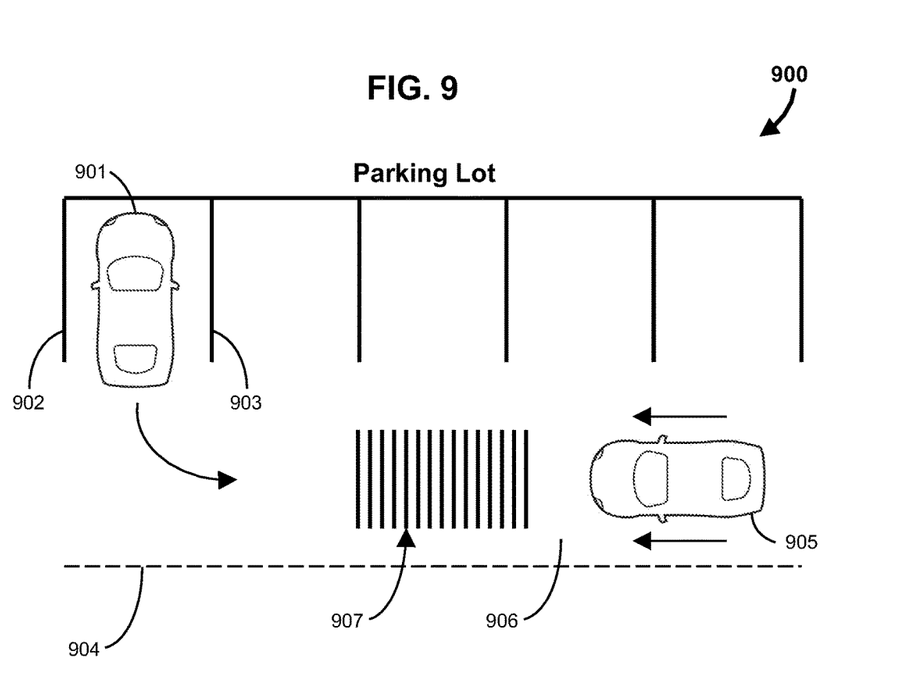
FIG. 9 is a haptic feedback use case.

FIG. 9 shows a distinct haptic feedback use case, based on concepts from the use case of FIG. 5, and configured to prevent a collision between a first vehicle 901 and a second vehicle 905 in a parking lot. The first vehicle 901 is connected to a smart wearable having the haptic motor. The first vehicle 901 includes the haptic program. The first vehicle 901 is parked in a spot defined between lines 902 and 903. The second vehicle 905 is traveling in a lane 904. The first vehicle 901 will reverse into the lane 904 as shown by the dark curved motion line extending from the rear of the first vehicle 901.

As with all use-cases, this use-case only activates (i.e., generates haptic feedback) when certain conditions are met, including one or more of: the first vehicle being in a reverse gear; the second vehicle being in an adjacent lane; the second vehicle being a predetermined distance from the first vehicle. The predetermined distance can be measured diagonally from the first vehicle 901 to the second vehicle 905 or perpendicularly along the lane 904 from the second vehicle 905 to a plane perpendicular to the longitudinal dimension of the lane 904 and extending from a closest surface of the first vehicle 901. The imaginary rumble zone may begin at the predetermined distance.

In this use case, the haptic program projects an imaginary rumble zone with a plurality of rumble strips 907. In the embodiment of FIG. 9, the rumble zone interacts with the second vehicle 905 and begins at the predetermined distance. In other words, the driver of the first vehicle 901 feels haptic feedback generated according to the properties of the second vehicle 905. This is distinct from the other use cases where the driver of a first vehicle feels haptic feedback generated according to the properties of the first vehicle.

In the embodiment of FIG. 9, the haptic program has projected the rumble zone 907, but has not yet produced haptic feedback because a gap 906 separates the second vehicle 905 from the rumble zone 907 (i.e., the second vehicle 905 is not close enough to the first vehicle 901 to activate the haptic feedback).

The above disclosure includes continuously updated haptic feedback signals. In some embodiments, haptic program observes or enforces a just-noticeable-difference rule (JND rule) between consecutive haptic feedback signals. The JND rule contemplates that for haptic alerts to be effective, the difference between consecutive haptic alerts must exceed a threshold.

For example, imagine a haptic pattern with the following two haptic feedback signals: [ON t1, OFF t2, ON t3, OFF t4]. As discussed above, in some embodiments, a single haptic feedback signal may combination of an ON instruction and an OFF instruction (i.e., t1+t2). Assume that t1+t2 does not equal t3+t4, such that the second feedback signal conveys different information that the first feedback signal. The JND rule holds that the difference between t1 and t3 (or t1+t2 vs. t3+t4) must be greater than the threshold for a user to notice a difference between the first feedback signal and the second feedback signal. In other words, if the difference is less than the threshold then the user will believe that the first and second haptic feedback signals are identical.

Therefore, in various embodiments, the above-use cases are subject to the JND rule such that consecutive haptic feedback signals must either be identical or must have a difference greater than or equal to the threshold. The haptic program may include a JND calibration tool. The calibration tool tests users' ability to distinguish between consecutive haptic feedback signals. The calibration tool may set the user's JND threshold at the lowest threshold where the user is consistently able to distinguish between consecutive signals. In various embodiments, consistent ability is an accuracy of more than one of the following: 70 percent, 80 percent, 90 percent, 95 percent, 97 percent, 99 percent, 99.5 percent, 99.9 percent, and 100 percent.

The following definitions apply to the claims: (1) A road boundary is a boundary between a lane and one of: a lane carrying traffic in the opposing direction and non-road (e.g., a median, a sidewalk, grass, dirt). (2) A lane boundary is a boundary between lanes of a road carrying traffic in the same directions. (3) A haptic motor is a motor configured to oscillate a mass to induce vibrations. The oscillation can be linear, rotary, or a combination of linear and rotary. (4) A matrix with a series of ON and OFF times includes the same matrix with the ON and OFF times switched. For example, a claimed matrix of [X ON, Y OFF, etc] also includes a matrix of [X OFF, Y ON, etc.]. (5) When the claims include the term "Doppler Effect", the claims contemplate and read on either one of the complete Doppler Effect and the approximated Doppler Effect.

The invention claimed is:
1. An intuitive haptic alert system comprising processor(s) in operative communication with a vehicle and configured to:
project rumble zone(s) over road, the projected rumble zone(s) including a sequence of projected recesses having a length "a", consecutive recesses being separated by a gap having a length "b";

identify when the vehicle occupies the projected rumble zone(s);

generate a sequence of commands for a haptic motor based on: an identified occupation of the projected rumble zone(s) and received vehicle velocity, each command including a motor ON time that equals "a"/(received vehicle velocity at time X) paired with a motor OFF time that equals "b"/(received vehicle velocity at time X), and wherein a:b =7:5.

2. The system of claim 1, wherein the processor(s) are configured to:

generate the sequence of commands based on a detected absence of a vehicle turn signal.

3. The system of claim 1, wherein the processor(s) are configured to generate the sequence of commands based on sets of conditions; the set of conditions for a zone projected over a lane boundary being different than the set of conditions for a zone projected over a road boundary.

4. The system of claim 1, wherein the processor(s) are configured to assign durations to non-identical consecutive commands so that the durations are different by at least a threshold period of time.

5. The system of claim 4, wherein the processor(s) are configured to execute a calibration program that determines the threshold period of time for a driver.

6. The system of claim 1, wherein the processor(s) are configured to project the projected rumble zone(s) over road boundaries and lane boundaries and vary the sequence of commands based on an estimated degree of vehicle intrusion into the projected zones.

7. The system of claim 1, wherein the vehicle is a first vehicle and the processor(s) are configured to:

detect a second vehicle leading the first vehicle;

project the rumble zone(s) over road between the first vehicle and the second vehicle.

8. The system of claim 7, wherein the processor(s) are configured to:

project at least one of a plurality of rumble zones over road between the first vehicle and the second vehicle.

9. An intuitive haptic alert system comprising processor(s) in operative communication with a first vehicle and configured to:

detect a second vehicle leading the first vehicle;

project rumble zone(s) over road between the first vehicle and the second vehicle, the projected rumble zone(s) including a sequence of projected recesses having a length "a", consecutive recesses being separated by a gap having a length "b";

identify when the first vehicle occupies the zone(s);

generate a sequence of commands for a haptic motor based on: an identified occupation of the projected rumble zone(s) and received vehicle velocity of the second vehicle.

10. The system of claim 9, wherein the processor(s) are configured to:

set the ratio of a:b for each of the projected rumble zone(s) based on a distance between said projected rumble zone and said second vehicle.

11. The system of claim 10, wherein the processor(s) are configured to:

increase a/b as the first vehicle approaches the second vehicle.

* * * * *